(12) United States Patent
Senshiki

(10) Patent No.: US 12,272,112 B2
(45) Date of Patent: Apr. 8, 2025

(54) ANNUNCIATION METHOD AND INFORMATION PROCESSING DEVICE

(71) Applicant: SEIKO EPSON CORPORATION, Tokyo (JP)

(72) Inventor: Hiroki Senshiki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 384 days.

(21) Appl. No.: 17/824,041

(22) Filed: May 25, 2022

(65) Prior Publication Data

US 2022/0383609 A1   Dec. 1, 2022

(30) Foreign Application Priority Data

May 26, 2021   (JP) ................................. 2021-088507

(51) Int. Cl.
 *G06V 10/20*   (2022.01)
 *G06T 7/70*   (2017.01)
 *G06V 20/52*   (2022.01)

(52) U.S. Cl.
 CPC .............. *G06V 10/255* (2022.01); *G06T 7/70* (2017.01); *G06V 20/52* (2022.01)

(58) Field of Classification Search
 None
 See application file for complete search history.

(56) References Cited

U.S. PATENT DOCUMENTS

| | | | | |
|---|---|---|---|---|
| 6,943,701 | B2* | 9/2005 | Zeineh | G08G 5/0078 |
| | | | | 340/936 |
| 9,157,749 | B2* | 10/2015 | Aoki | G01C 21/30 |
| 9,373,149 | B2* | 6/2016 | Abhyanker | G06Q 10/10 |
| 9,784,972 | B2* | 10/2017 | Aratani | G06T 19/006 |
| 10,241,566 | B2* | 3/2019 | Sawyer | G02B 27/0093 |

(Continued)

FOREIGN PATENT DOCUMENTS

| | | |
|---|---|---|
| JP | 2007-272474 A | 10/2007 |
| JP | 2017-178559 A | 10/2017 |

(Continued)

OTHER PUBLICATIONS

"Queuesight". <URL:https://www.queuesight.com/>.

(Continued)

*Primary Examiner* — Anand P Bhatnagar
(74) *Attorney, Agent, or Firm* — Oliff PLC

(57) ABSTRACT

An annunciation method includes the steps of obtaining first position information as position information of a place where a first object is located, obtaining second position information as position information of a place where a second object is located, obtaining third position information as position information of a place where a third object is located, setting the first object and the second object as a first group when a distance between the first object and the second object calculated based on the first position information and the second position information is smaller than or equal to a first threshold value, obtaining fourth position information representing a position of the first group, and performing annunciation when a distance between the third object and the first group calculated based on the third position information and the fourth position information is smaller than a second threshold value.

9 Claims, 14 Drawing Sheets

(56) References Cited

U.S. PATENT DOCUMENTS

| | | | |
|---|---|---|---|
| 11,027,648 B2 * | 6/2021 | Harper | G10K 13/00 |
| 11,797,022 B1 * | 10/2023 | Ballantyne | G06T 7/13 |
| 2002/0191819 A1 | 12/2002 | Hashimoto et al. | |
| 2019/0318619 A1 * | 10/2019 | Iwano | G08G 1/09 |
| 2019/0364251 A1 | 11/2019 | Tsubota et al. | |
| 2020/0253683 A1 * | 8/2020 | Amanatullah | A61B 90/06 |
| 2021/0201478 A1 * | 7/2021 | Zhang | G06T 7/0012 |
| 2023/0200913 A1 * | 6/2023 | Amanatullah | G16H 40/20 |
| | | | 382/128 |
| 2023/0256904 A1 * | 8/2023 | Yamashita | B60Q 9/008 |
| | | | 340/904 |
| 2024/0070932 A1 * | 2/2024 | Green | G06T 19/20 |

FOREIGN PATENT DOCUMENTS

| | | |
|---|---|---|
| JP | 6764214 B1 | 9/2020 |
| JP | 2022-099156 A | 7/2022 |
| WO | 02/056251 A1 | 7/2002 |
| WO | 18/173311 A1 | 9/2018 |

OTHER PUBLICATIONS

"Enjoyable Spatial Presentations Linked To People's Walks That Induce Physical Distancing". Hitachi, Ltd. Research and Development Group, Sep. 23, 2020.

"Free Contents for Our Space Player Users". Space Player Simple Setup Manual 11-16.

"Queuesight Animation". <URL: https://www.youtube.com/watch?v=utQDOrcKcMk>.

"Queuesight Demo (Grouping/Perimeter Distancing)". <URL: https://www.youtube.com/watch?v=VFpaFILw264>.

"Queuesight Demo". <URL: https://www.youtube.com/watch?v=CVfGQ-Y2db0>.

"Physical Distancing by System to Link Walking People and Spatial Distance—Hitachi". <URL: https://www.youtube.com/watch?v=gKUQjnuOtbg>.

* cited by examiner

ANNUNCIATION METHOD AND INFORMATION PROCESSING DEVICE

The present application is based on, and claims priority from JP Application Serial Number 2021-088507, filed May 26, 2021, the disclosure of which is hereby incorporated by reference herein in its entirety.

BACKGROUND

1. Technical Field

The present disclosure relates to an annunciation method, an information processing device, and a display system for ensuring a social distance.

2. Related Art

In recent years, it is desired to keep an appropriate people-to-people distance, a so-called social distance, in a public place or the like as a countermeasure for infectious diseases. Although it is dependent on the individual attention in the past, in Japanese Patent No. 6764214, for example, there is disclosed a congestion information announcing system which detects a person from an image taken by a surveillance camera using machine learning, and displays an image in which a ring-like line representing the social distance is overlapped at the position of the person thus detected.

However, when adopting a method of performing the detection on each of persons, a group constituted by a plurality of persons which always acts in line and is therefore not required to keep the social distance such as a pair of a person who is riding a wheel chair and a person who pushes the wheel chair, or a set of parent and child holding hands with each other is not distinguished as a result. In other words, there has been a problem that there has not been proposed a method of determining and then announcing whether or not the social distance has been kept based on a procedure and a result of the detection of a person or a group who should keep the social distance.

SUMMARY

An aspect for solving the problem described above is directed to an annunciation method including obtaining first position information as position information of a place where a first object is located, obtaining second position information as position information of a place where a second object is located, obtaining third position information as position information of a place where a third object is located, combining the first object and the second object with each other to set the first object and the second object as a first group when a distance between the first object and the second object calculated based on the first position information and the second position information is smaller than or equal to a first threshold value set in advance, deciding fourth position information representing a position of the first group, and performing annunciation when a distance between the third object and the first group calculated based on the third position information and the fourth position information is smaller than a second threshold value set in advance, wherein the first threshold value is smaller than the second threshold value.

Another aspect for solving the problem described above is directed to an information processing device including a position information acquisition section configured to obtain position information of a place where an object is located, and an arithmetic section configured to calculate a distance between objects based on the position information, wherein the position information acquisition section obtains first position information as position information of a place where a first object is located, second position information as position information of a place where a second object is located, and third position information as position information of a place where a third object is located, the arithmetic section sets the first object and the second object as a first group, and decides fourth position information representing a position of the first group when a distance between the first object and the second object calculated based on the first position information and the second position information is smaller than or equal to a first threshold value set in advance, there is further provided an annunciation section configured to announce warning information when a distance between the third object and the first group calculated based on the third position information and the fourth position information is smaller than a second threshold value set in advance, and the first threshold value is smaller than the second threshold value.

Another aspect for solving the problem described above is directed to a display system including an information processing device having a position information acquisition section configured to obtain position information of a place where an object is located, and an arithmetic section configured to calculate a distance between objects based on the position information, and an information providing device configured to provide information to an outside, wherein the position information acquisition section obtains first position information as position information of a place where a first object is located, and second position information as position information of a place where a second object is located, the arithmetic section combines the first object and the second object with each other to set the first object and the second object as a first group, and decides fourth position information representing a position of the first group when a distance between the first object and the second object calculated based on the first position information and the second position information is smaller than or equal to a first threshold value set in advance, and the information providing device displays a first image based on a distance from the position of the first group based on the fourth position information.

Another aspect for solving the problem described above is directed to a display system including an information processing device having a position information acquisition section configured to obtain position information of a place where an object is located, and an arithmetic section configured to calculate a distance between objects based on the position information, and an information providing device configured to provide information to an outside, wherein the position information acquisition section obtains first position information as position information of a place where a first object is located, second position information as position information of a place where a second object is located, and third position information as position information of a place where a third object is located, the arithmetic section combines the first object and the second object with each other to set the first object and the second object as a first group, and decides fourth position information representing a position of the first group when a distance between the first object and the second object calculated based on the first position information and the second position information is smaller than or equal to a first threshold value set in advance, the information providing device displays a warning image when a distance between the third object and the first group calculated based on the third position information and the fourth position information is smaller than a second threshold value set in advance, and the first threshold value is smaller than the second threshold value.

DESCRIPTION OF EXEMPLARY EMBODIMENTS

Figure 1:
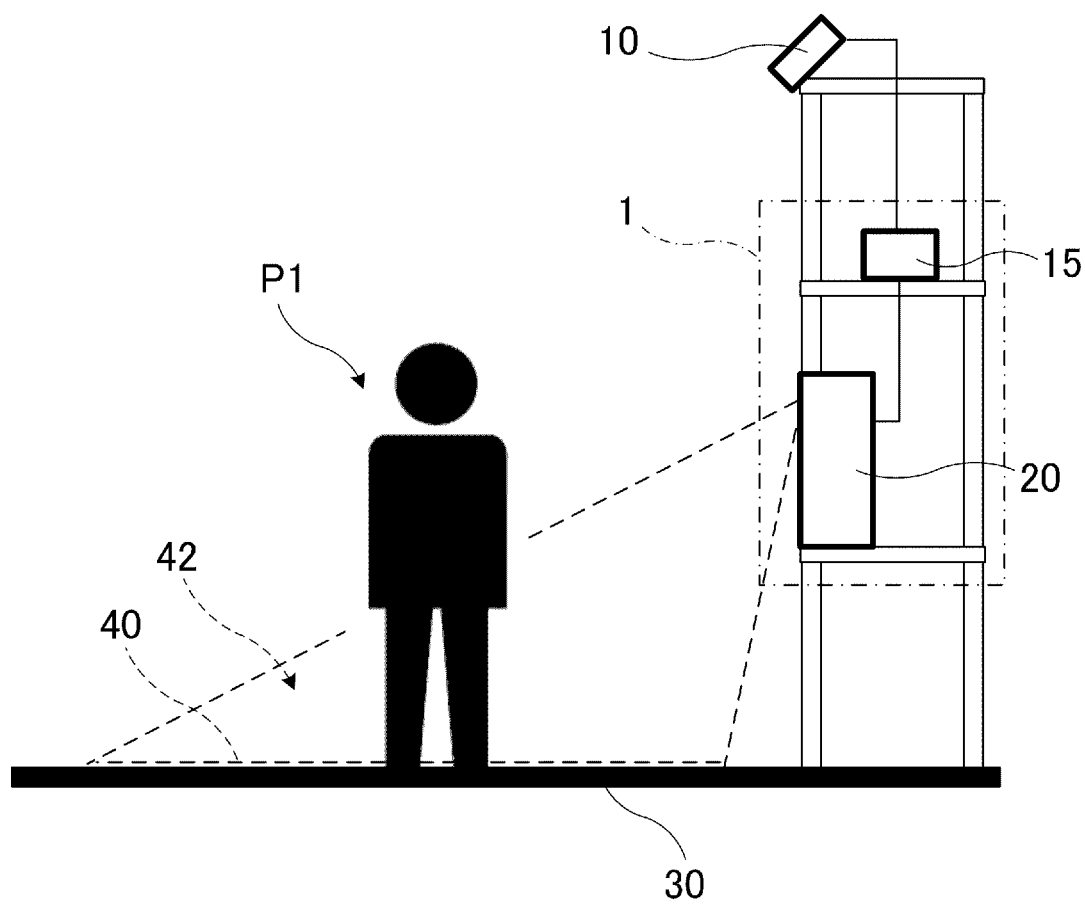
FIG. 1 is an explanatory diagram showing a configuration of a display system.

Some embodiments of the present disclosure will hereinafter be described with reference to the accompanying drawings. FIG. 1 through FIG. 14 show an example of an aspect implementing the present disclosure, wherein portions denoted by the same reference symbols represent the same things in the drawings. It should be noted that in each of the drawings, some constituents are arbitrarily omitted to simplify the drawing. Further, a size, a shape, a thickness, and so on of a member are expressed arbitrarily with exaggeration.

FIG. 1 is an explanatory diagram showing a configuration of a display system 1 according to a first embodiment. The display system 1 has an information processing device 15 for processing information, and a projector 20 as an information providing device for announcing the information. Specifically, the display system 1 is coupled to a detection device 10 for detecting a person or an object, and the information processing device 15 processes the information detected by the detection device 10. Further, the display system 1 is coupled to the information providing device for announcing information related to the social distance to a first object P1 as a target required to keep the social distance, specifically a projector 20 which generates projection light 42 to project a projection image 40.

When a person has been detected as the first object P1, the projector 20 projects the projection image 40 on a floor surface 30 on the periphery of the person to thereby make it possible to make the person as the first object P1 recognize the social distance. Specifically, it is possible to display an image stored in advance by the information processing device 15 within a disk area centering on the first object P1. On this occasion, it is possible to generate the image in real time, or it is possible to clip and then display a part of the image stored by the information processing device 15. A range smaller than or equal to the social distance for the person as the first object P1 means, for example, a range represented by a circular disc having a diameter of 1 m centering on the first object P1. The projector 20 can move the projection image 40 in accordance with a translation of the first object P1.

As the detection device 10, an RGB-D camera which can obtain a range image, specifically, three-dimensional position information is desirable. Naturally, it is possible to include a measurement device which can measure a distance such as an ultrasonic sensor, a stereo camera, or an LiDAR (Light Detection and Ranging). Alternatively, the detection device 10 can be an imaging device such as a camera, and can extract the range information due to an image recognition function provided to the information processing device 15.

As the information processing device 15, there can be adopted an information terminal such as a personal computer, a smartphone, or a tablet PC (Personal Computer). The information processing device 15 is constituted by a CPU (Central Processing Unit), a RAM (Random Access Memory) and a ROM (Read Only Memory), a storage medium, and so on, and performs a variety of types of control. The CPU is a so-called central arithmetic processing unit, and executes a variety of programs to realize a variety of functions. The RAM is used as a working area and a storage area for the CPU, and the ROM stores an operating system and a program to be executed in the CPU. The storage medium can be, for example, a hard disk or an SSD (Solid State Drive). The information processing device 15 can be arranged at a place physically close to the object to be the target, or can also be a server placed at a remote location. The information processing device 15 is not necessarily required to be an independent device, and can also be a processor included in a device integrated with, for example, the detection device 10 or the projector 20.

Further, although the projector 20 for projecting an image is cited here as an example of the information providing device for announcing the information related to the social distance, this is not a limitation. Specifically, as the information providing device for announcing the information, it is possible to adopt a speaker for emitting, for example, a warning sound, and as the display device, it is possible to adopt a flat panel display which is unfolded on the entire floor surface to display an image. Further, it is possible to visually announcing the information by making the user wear a head-mounted display or the like, and overlapping a so-called augmented reality image on a scenery in the real world in order to make the user recognize the social distance.

Figure 2:
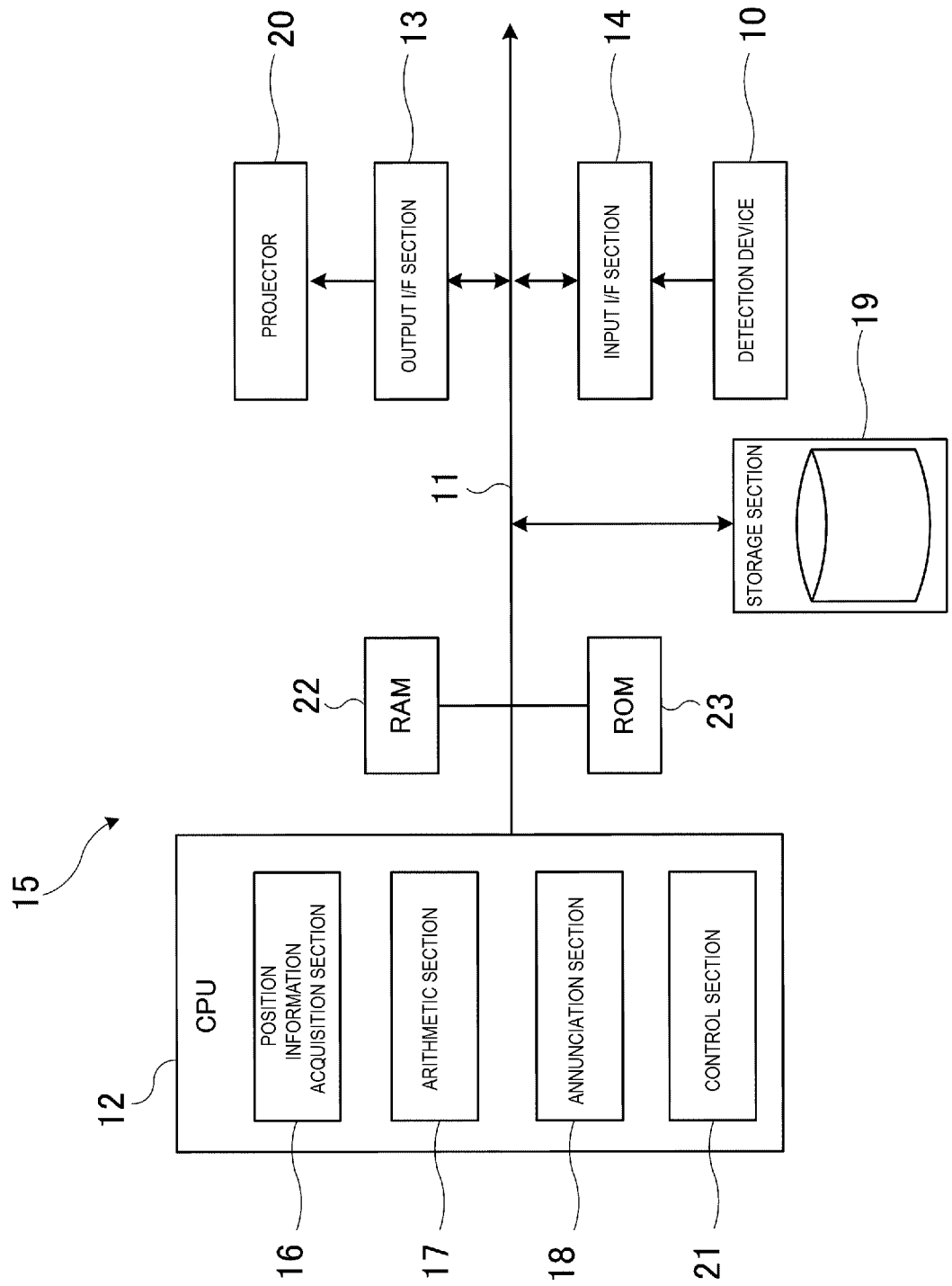
FIG. 2 is a configuration diagram of an information processing device.

FIG. 2 is a configuration diagram of the information processing device 15. The information processing device 15 has a CPU 12 for performing information processing, a RAM 22 as a volatile storage element, and a ROM 23 as a nonvolatile storage element. The information processing device 15 is provided with an output I/F section 13 used for output to an external device such as the projector 20, and an input I/F section 14 used for input from the detection device 10, wherein the constituents are coupled to each other with an internal bus 11.

The CPU 12 executes the program stored in a storage section 19 to thereby realize a function of a position information acquisition section 16 for obtaining position information of an object detected by the detection device 10. Further, the CPU 12 realizes a function of an arithmetic section 17 which calculates a distance between the objects and so on from the position information thus obtained, and then performs, for example, a judgment based on the calculation result. Further, the CPU 12 realizes a function of an annunciation section 18 for announcing the information related to the social distance to the person and so on to be the target. When using a method of making the projector 20 project the image when the annunciation section 18 announces the information, the CPU 12 realizes a function of a control section 21 which performs control of the projector 20.

In the information processing device 15, the storage section 19 stores necessary information such as an image to be projected by the projector 20. The storage section 19 can be realized by a storage medium such as a hard disk or an SSD.

Further, the output I/F section 13 and the input I/F section 14 interchange information with the detection device 10 and the projector 20 using wired connection or wireless connection. The output I/F section 13 and the input I/F section 14 are each provided with, for example, an interface circuit. Specifically, the output I/F section 13 and the input I/F section 14 can perform an input/output process of the information based on a wireless communication standard such as WiFi (registered trademark) or Bluetooth (registered trademark).

Figure 3:
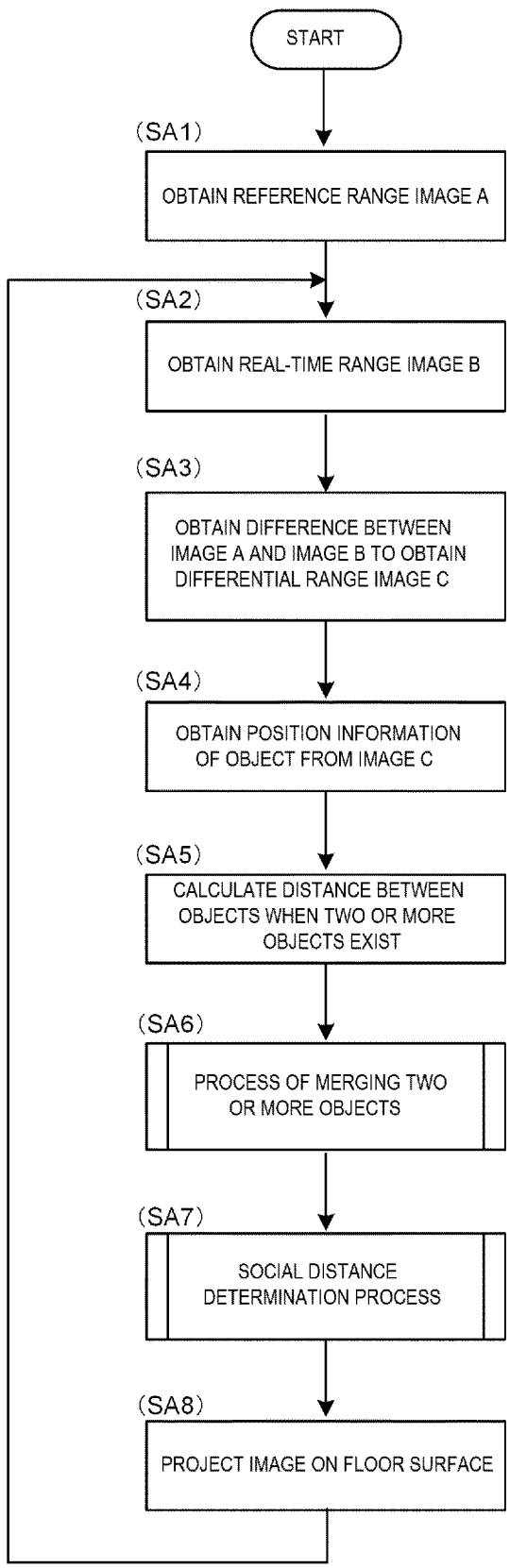
FIG. 3 is a flowchart showing an operation of the display system.

FIG. 3 is a flowchart showing an operation of the display system 1 according to the present embodiment. The display system 1 obtains (step SA1) a reference range image A from the detection device 10. Specifically, the detection device 10 is, for example, an RGB-D camera, obtains range information with respect to the floor surface 30 in FIG. 1 in advance, and stores the range information in, for example, the storage section 19 of the information processing device 15. Then, the display system 1 obtains (step SA2) a real-time range image B from the detection device 10. For example, as a frame rate of acquisition, there can be adopted about 5 FPS. Further, the arithmetic section 17 of the display system 1 calculates a difference between the reference range image A and the real-time range image B to obtain (step SA3) a differential range image C. Due to this operation, the display system 1 recognizes a change from the reference range image A, and the position information acquisition section 16 obtains (step SA4) the position information of the object existing within the detection range of the detection device 10 from the differential range image C. Here, the position information can be information of a barycentric position of the object obtained from the differential range image C of the object.

When there are two or more objects within the detection range, the arithmetic section 17 calculates and obtains (step SA5) a distance between the objects. Then, a merging process of the two or more objects is performed (step SA6). The merging process will be described with reference to FIG. 4 described later. The merging process specifically means processing of treating two or more objects as a single group when the two or more objects fulfill a predetermined condition. The processing is performed frame by frame. Then, there is performed (step SA7) a social distance determination process as a determination on whether or not the social distance is kept between objects and groups within the detection range, and processing based on a result of the determination. The social distance determination process will be described with reference to FIG. 5 described later. Then, the annunciation section 18 of the display system 1 announces the information based on a processing result of the social distance determination process. Specifically, the projector 20 projects (step SA8) an image on the floor surface 30. That image can be an entertaining image when, for example, the social distance is kept between two or more objects existing within the detection range, or a warning image when the social distance is not kept therebetween. The steps described hereinabove are repeated (the process returns to the step SA2).

Figure 4:
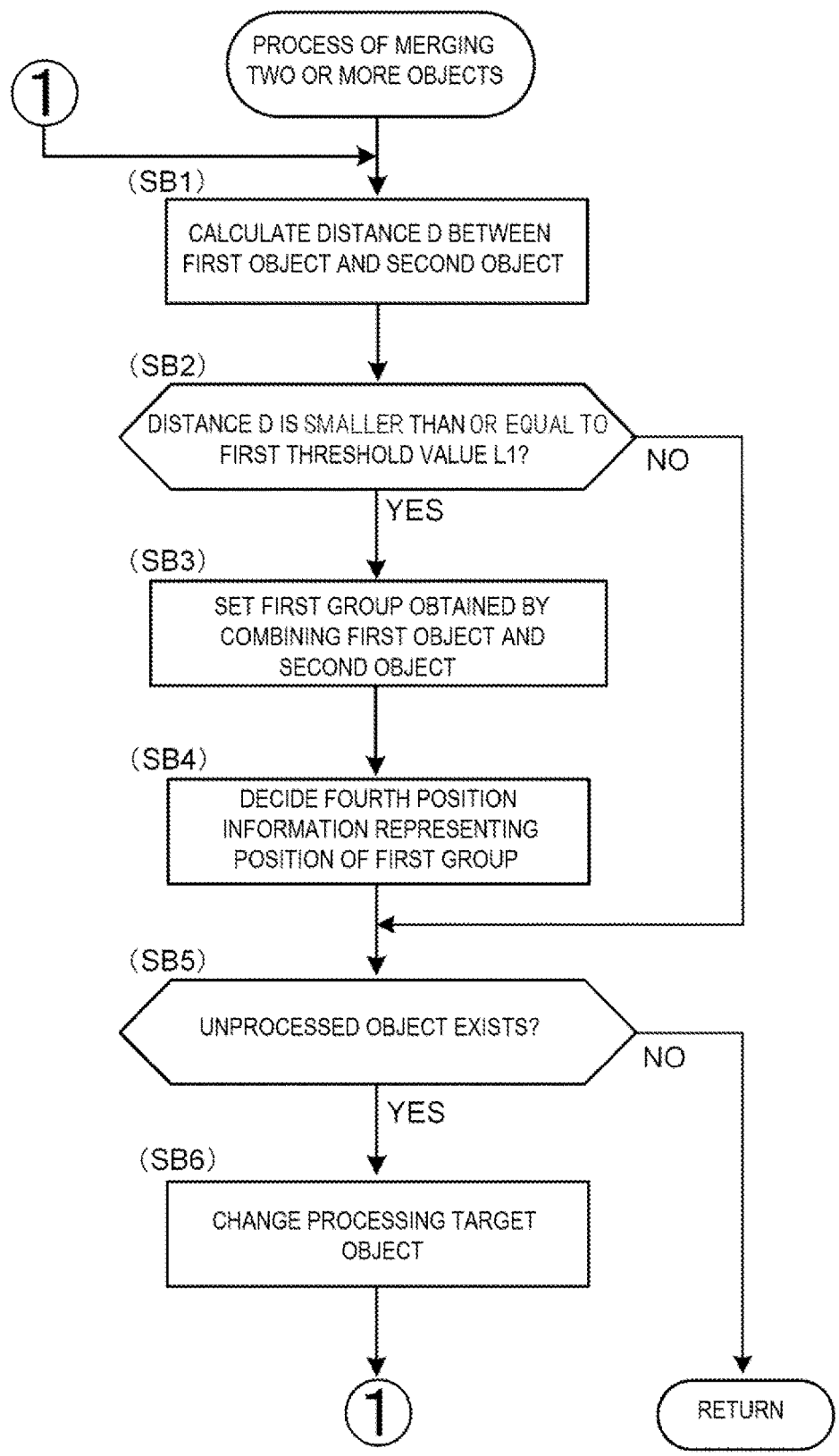
FIG. 4 is a flowchart of a merging process in which two or more objects are treated as a group.

FIG. 4 is a flowchart of the merging process as an operation of the display system 1 treating two or more objects as a single group. First, the display system 1 calculates (step SB1) a distance D between two or more objects existing within the detection range, for example, a first object and a second object. On this occasion, it is possible for the display system 1 to calculate the distance D using the position information obtained by the position information acquisition section 16 in the step SA4 of the flowchart shown in FIG. 3. Specifically, the arithmetic section 17 calculates the distance D between the first object and the second object based on first position information as the position information of the place where the first object is located and second position information as the position information of the place where the second object is located.

Then, the arithmetic section 17 of the display system 1 determines (step SB2) whether or not the distance D is smaller than or equal to a first threshold value L1 set in advance. When the distance D is smaller than or equal to the first threshold value L1 (YES in the step SB2), the arithmetic section 17 sets (step SB3) a first group obtained by combining the first object and the second object with each other. Further, when the distance D is larger than the first threshold value L1 (NO in the step SB2), the process proceeds to the step SB5. Here, the first threshold value L1 is, for example, 1 m.

When the arithmetic section 17 sets the first group obtained by combining the first object and the second object with each other (step SB3), the arithmetic section 17 decides (step SB4) fourth position information representing a position of the first group. Here, the position of the first group can be a barycentric position of a figure obtained by combining the first object and the second object with each other which can be calculated from the differential range image C. The display system 1 determines (step SB5) whether or not there exists an unprocessed object within the detection range. When there exists an object on which the merging process has not been performed (YES in the step SB5), the object which can be the target of the merging process is changed, and then the process returns to the step SB1 (step SB6). On this occasion, the fourth position information and so on regarding the first group are stored in the storage section 19. When the object on which the merging process has not been performed does not exist within the detection range of the display system 1 (NO in the step SB5), the merging process is terminated (the process returns).

Figure 5:
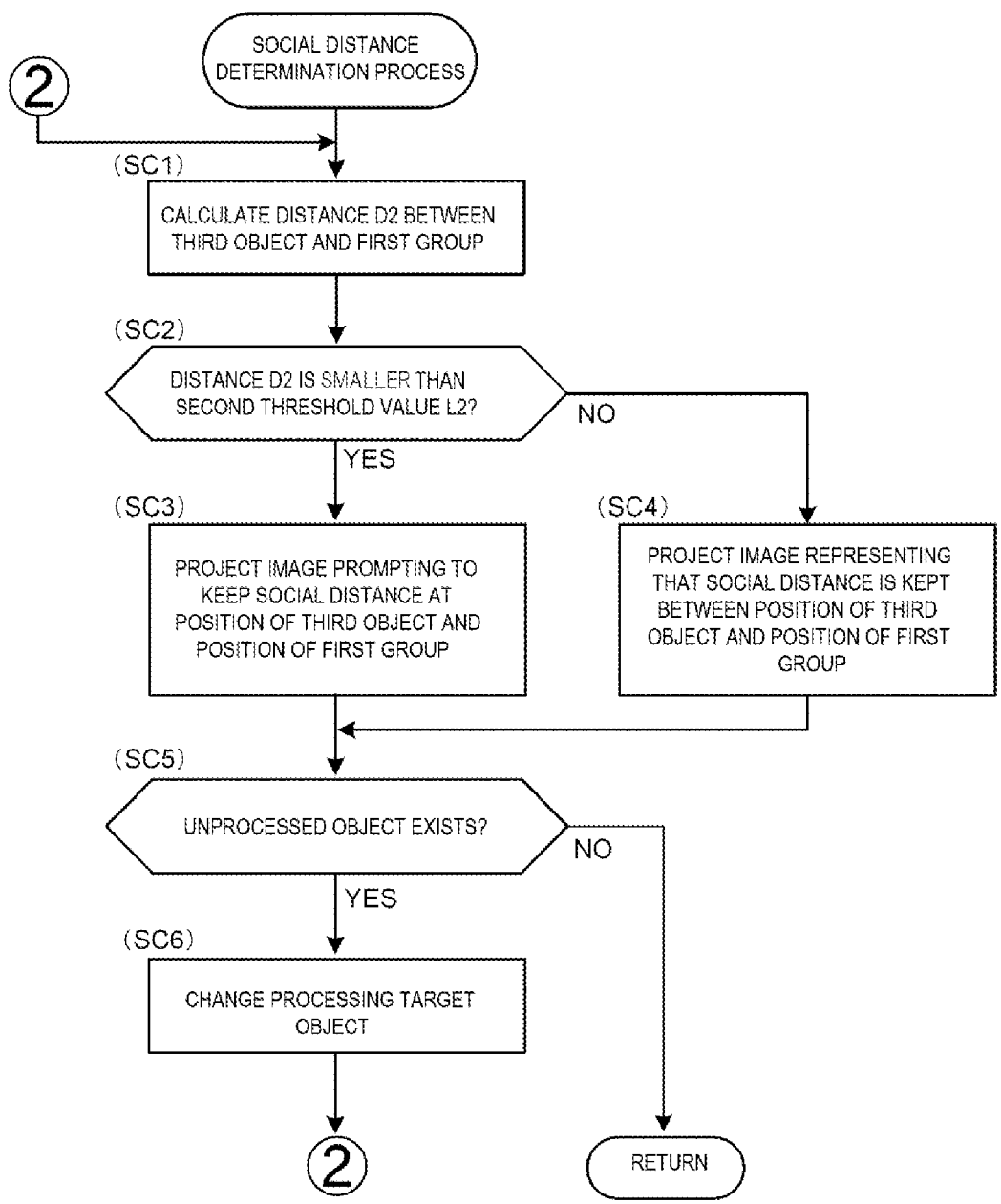
FIG. 5 is a flowchart of a social distance determination process between two or more objects.

FIG. 5 is a flowchart of the social distance determination process between two or more objects existing within the detection range. The present flowchart is described on the premise that there exists the first group grouped in the merging process, but when no group is generated in the merging process, the group can be read as a single object. Naturally, when there exist two or more groups grouped in the merging process, a relationship between an object and a group described can be read as a relationship between two or more groups. Now, the arithmetic section 17 of the display system 1 calculates (step SC1) a distance D2 between a third object and the first group existing within the detection range. Specifically, the arithmetic section 17 calculates the distance D2 based on the fourth position information representing the position of the first group decided in the step SB4 shown in FIG. 4, and third position information as information of the place where the third object is located.

Then, the arithmetic section 17 determines (step SC2) whether or not the distance D2 is smaller than a second threshold value L2 set in advance. Specifically, the second threshold value L2 can be a so-called social distance, and is, for example, 2 m. Further, the first threshold value L1 used as a criterion of the determination in the step SB2 shown in FIG. 4 is smaller than the second threshold value L2.

When the distance D2 is smaller than the second threshold value L2 set in advance (YES in the step SC2), an image which prompts to keep the social distance is projected (step SC3) at the position of the third object and the position of the first group. When the distance D2 is larger than or equal to the second threshold value L2 set in advance (NO in the step SC2), an image which represents the fact that the social distance is kept is projected (step SC4) at the position of the third object and the position of the first group.

After performing the processing in the step SC3 or the step SC4, the arithmetic section 17 of the display system 1 determines (step SC5) whether or not an unprocessed object exists within the detection range. When the unprocessed object exists (YES in the step SC5), the display system 1 changes (step SC6) the object as the processing target of the social distance determination process, and then the process returns to the step SC1. When the unprocessed object does not exist (NO in the step SC5), the social distance determination process is terminated (the process returns).

Then, the information processing device 15 according to a second embodiment will be described. It should be noted that a functional configuration of the information processing device 15 is substantially the same as that of the information processing device 15 provided to the display system 1 according to the first embodiment, and the detailed description thereof will be omitted.

The information processing device 15 according to the second embodiment is an information processing device having the position information acquisition section 16 for obtaining position information of the place where an object is located, and the arithmetic section 17 for calculating a distance between objects based on the position information. The position information acquisition section 16 obtains the first position information as the position information of the place where the first object is located, the second position information as the position information of the place where the second object is located, and the third position information as the position information of the place where the third object is located. The arithmetic section 17 decides a distance between the first object and the second object based on the first position information and the second position information. Further, when the distance between the first object and the second object is smaller than or equal to the first threshold value set in advance, the information processing device 15 sets the first object and the second object to the first group, and then decides the fourth position information representing the position of the first group. The information processing device 15 is further provided with the annunciation section 18 which announces warning information when the distance between the third object and the first group calculated based on the third position information and the fourth position information is smaller than the second threshold value set in advance. It is possible for the annunciation section 18 to announce the warning information that the distance between the third object and the first group is smaller than the second threshold value to an external device.

As the information processing device 15, there can be adopted an information terminal such as a personal computer, a smartphone, or a tablet PC. The information processing device 15 is constituted by a CPU, a RAM and a ROM, a storage medium, and so on, and performs a variety of types of control. The CPU is a so-called central arithmetic processing unit, and executes a variety of programs to realize a variety of functions. The RAM is used as a working area and a storage area for the CPU, and the ROM stores an operating system and a program to be executed in the CPU. The storage medium can be, for example, a hard disk or an SSD. The information processing device 15 can be arranged at a place physically close to the object to be the target, or can also be a server placed at a remote location. The information processing device 15 is not necessarily required to be an independent device, and can also be a processor included in a device integrated with, for example, the detection device 10 or the projector 20 as the external device.

An annunciation method according to a third embodiment will be described using FIG. 6 through FIG. 14.

Figure 6:
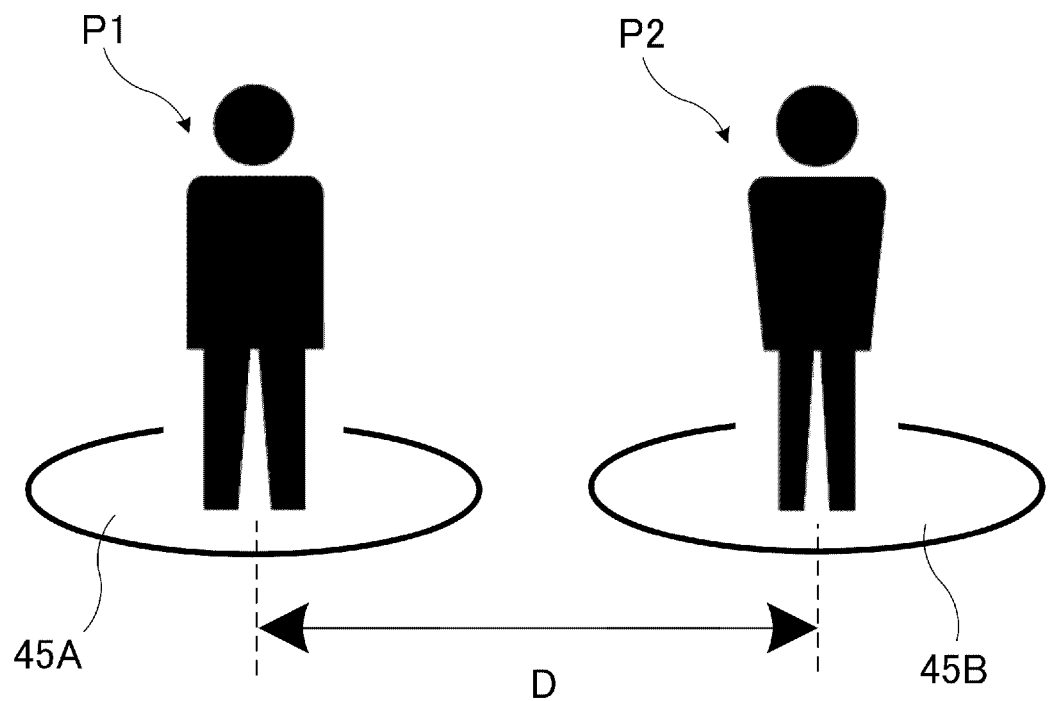
FIG. 6 is an explanatory diagram of two objects distant as much as a distance larger than or equal to a social distance from each other.

FIG. 6 is an explanatory diagram of the annunciation method to two objects distant as much as a distance larger than or equal to the social distance. Specifically, in the annunciation method, the first position information as the position information of the place where the first object P1 is located is obtained, and the second position information as the position information of the place where a second object P2 is located is obtained. Here, the position information can represent, for example, a barycentric position of an area where the object is detected. In the annunciation method, the distance D between the first object P1 and the second object P2 is decided based on the first position information and the second position information. In the annunciation method, when the distance D is larger than or equal to the second threshold value L2 set in advance, since there is established the state in which the social distance is kept, the fact that the social distance is kept is announced to a person as the first object P1 and a person as the second object P2. Specifically, in the annunciation method, a first image 45A is projected in a disk area which centers on the position of the first object P1, and has a diameter equal to the second threshold value L2, and a first image 45B is projected in a disk area which centers on the position of the second object P2, and has a diameter equal to the second threshold value L2. Here, the first image can be an entertaining image, and can be an image stored in the storage section 19. Further, the first image can be generated frame by frame. It is desirable for the first image to move in accordance with the translation of the first object P1 or the second object P2.

Figure 7:
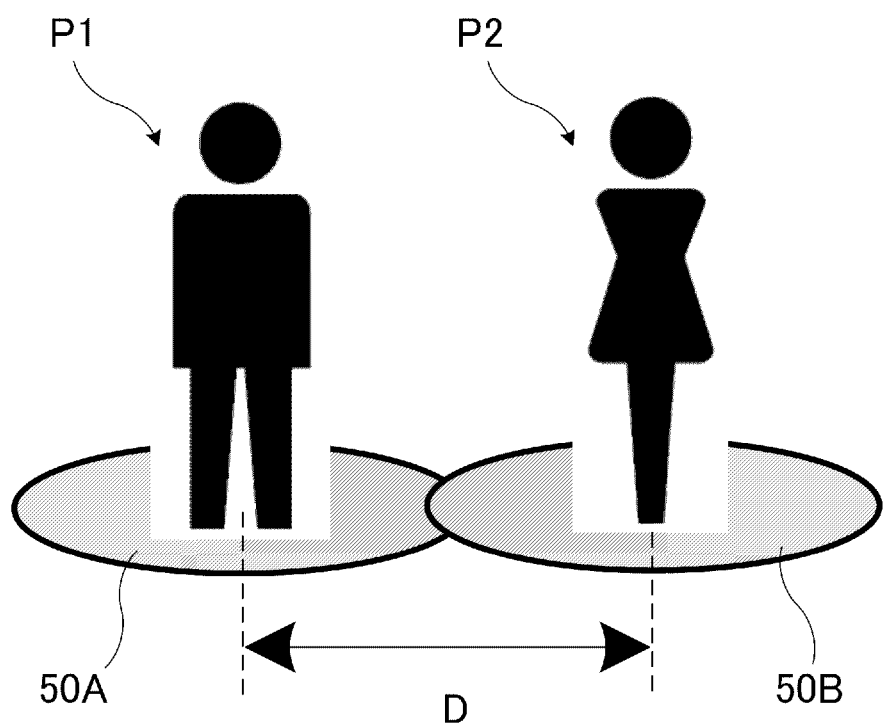
FIG. 7 is an explanatory diagram of two objects distant as much as a distance smaller than the social distance from each other and a display image.

FIG. 7 is an explanatory diagram of the annunciation method to two objects located within a range smaller than the social distance. Specifically, in the annunciation method according to the present embodiment, the first position information as the position information of the place where the first object P1 is located is obtained, and the second position information as the position information of the place where the second object P2 is located is obtained. Further, in the annunciation method, the distance D between the first object P1 and the second object P2 is decided based on the first position information and the second position information. In the annunciation method, when the distance D is smaller than the second threshold value L2 set in advance, since there is established the state in which the social distance is not kept, the warning information is announced to the person as the first object P1 and the person as the second object P2. Specifically, in the annunciation method, a second image 50A as the warning image can be projected in a disk area which centers on the position of the first object P1, and has a diameter equal to the second threshold value L2, and a second image 50B as the warning image can be projected in a disk area which centers on the position of the second object P2, and has a diameter equal to the second threshold value L2.

Figure 8:
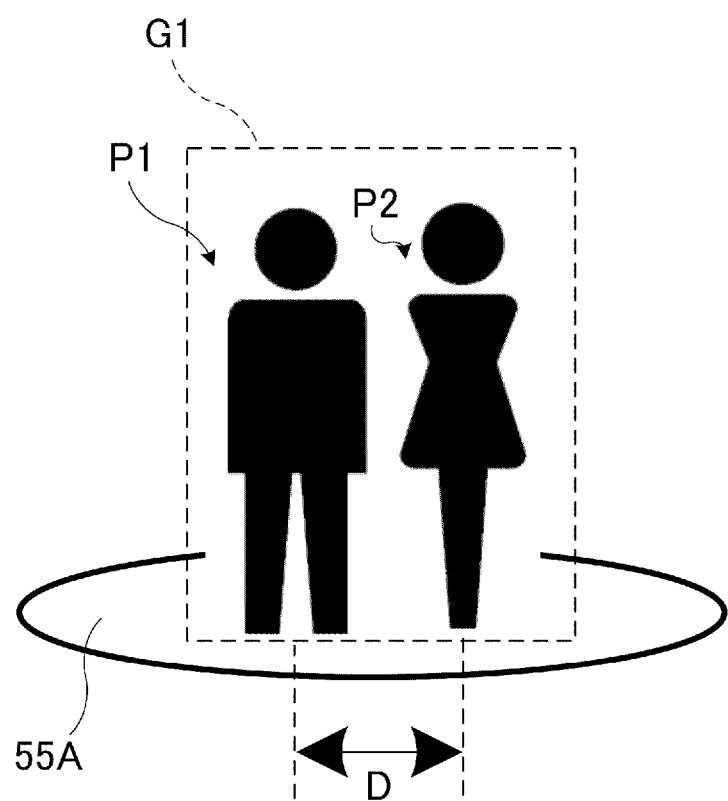
FIG. 8 is an explanatory diagram showing a method of treating two or more objects as a single group.

FIG. 8 is an explanatory diagram showing an annunciation method of treating two or more objects as a single group to perform the annunciation. Specifically, in the annunciation method according to the present embodiment, the first position information as the position information of the place where the first object P1 is located is obtained, and the second position information as the position information of the place where the second object P2 is located is obtained. Further, in the annunciation method, the distance D between the first object P1 and the second object P2 is decided based on the first position information and the second position information. In the annunciation method, when the distance D is smaller than or equal to the first threshold value L1 set in advance, the first object and the second object are combined with each other, and are set as a first group G1. Further, in the annunciation method, the fourth position information representing the position of the first group is decided. Specifically, the position of the first group can be a barycentric position of a figure obtained by combining the first object and the second object detected with each other. Due to the fact that the distance D is smaller than or equal to the first threshold value L1 set in advance, it is possible to determine that the first object and the second object are the combination of the persons in a relationship of belonging to the same group acting in line. Therefore, there is no need to keep the social distance between the first object P1 and the second object P2, and it is sufficient to consider the social distance between the first group and another person. Specifically, in the annunciation method, it is possible to project a third image 55A representing the social distance in a disk area which centers on the position of the first group based on the fourth position information, and has a diameter equal to the second threshold value L2.

Figure 9:
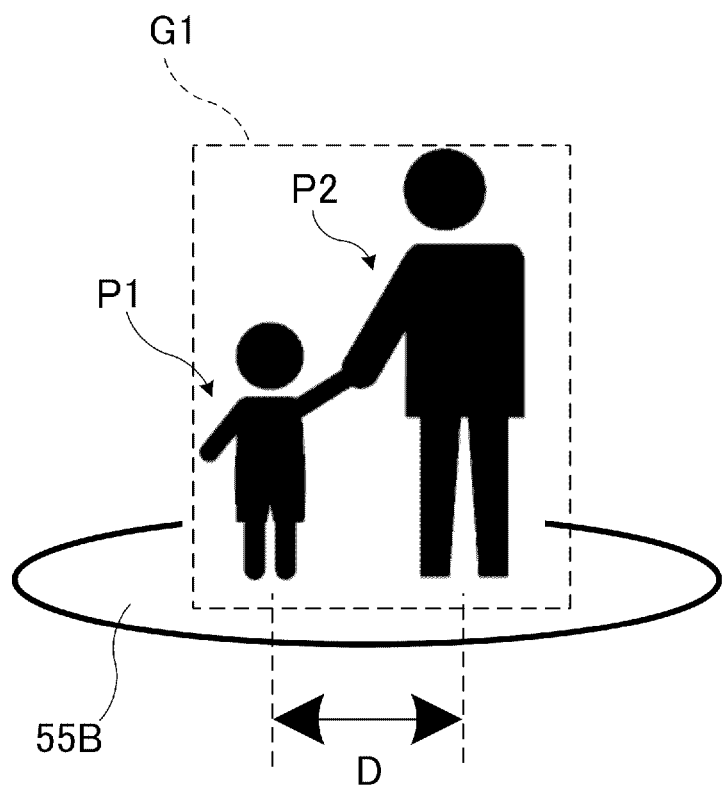
FIG. 9 is an explanatory diagram showing a method of treating two or more objects as a single group.

FIG. 9 is an explanatory diagram showing an annunciation method of treating two or more objects, specifically parent and child holding hands with each other, as a single group to perform the annunciation. Specifically, in the annunciation method according to the present embodiment, the first position information as the position information of the place where the first object P1 is located is obtained, and the second position information as the position information of the place where the second object P2 is located is obtained. Further, in the annunciation method, the distance D between the first object P1 and the second object P2 is decided based on the first position information and the second position information. In the annunciation method, when the distance D is smaller than or equal to the first threshold value L1 set in advance, the first object and the second object are combined with each other, and are set as the first group G1. Further, in the annunciation method, the fourth position information representing the position of the first group is decided. Specifically, the position of the first group can be a barycentric position of a figure obtained by combining the first object and the second object detected with each other. Due to the fact that the distance D is smaller than or equal to the first threshold value L1 set in advance, it is possible to determine that the first object and the second object are the combination of the persons belonging to the same group acting in line. Therefore, there is no need to keep the social distance between the first object P1 and the second object P2, and it is sufficient to consider the social distance between the first group and another person. Specifically, in the annunciation method, it is possible to project a third image 55B representing the social distance in the disk area which centers on the position of the first group based on the fourth position information, and has a diameter equal to the second threshold value L2.

Figure 10:
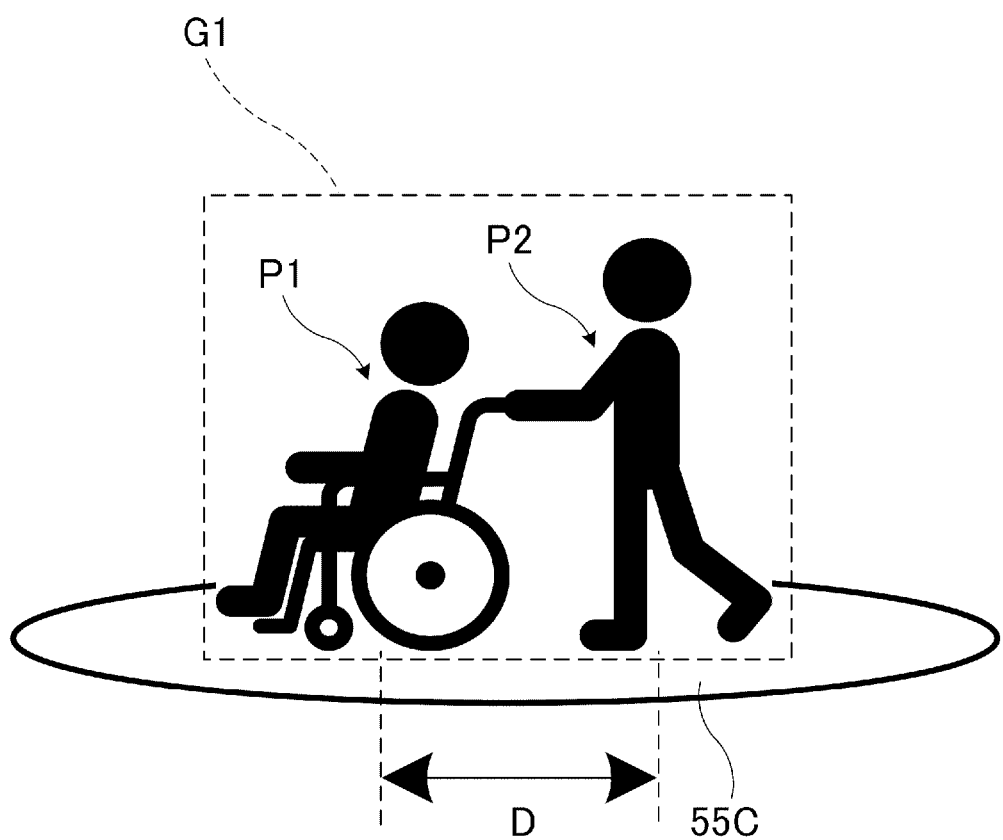
FIG. 10 is an explanatory diagram showing a method of treating two or more objects as a single group.

FIG. 10 is an explanatory diagram showing an annunciation method of treating two or more objects, specifically a person who receives care support with a wheel chair and a care supporter, as a single group to perform the annunciation. Specifically, in the annunciation method according to the present embodiment, the first position information as the position information of the place where the first object P1 as the person who receives case support with the wheel chair is located is obtained. Further, in the annunciation method, the second position information as the position information of the place where the second object P2 as the care supporter is located is obtained. Further, the distance D between the first object P1 and the second object P2 is decided based on the first position information and the second position information. In the annunciation method, when the distance D is smaller than or equal to the first threshold value L1 set in advance, the first object and the second object are combined with each other, and are set as the first group G1. Further, in the annunciation method, the fourth position information representing the position of the first group is decided. Specifically, the position of the first group can be a barycentric position of a figure obtained by combining the first object and the second object detected with each other. Due to the fact that the distance D is smaller than or equal to the first threshold value L1 set in advance, it is possible to determine that the first object and the second object are the combination of the persons belonging to the same group acting in line. Therefore, there is no need to keep the social distance between the first object P1 and the second object P2, and it is sufficient to consider the social distance between the first group and another person. Specifically, in the annunciation method, it is possible to project a third image 55C representing the social distance in a disk area which centers on the position of the first group based on the fourth position information, and has a diameter equal to the second threshold value L2.

It should be noted that when using the wheel chair, the first object P1 itself is large in area. Therefore, it is conceivable that only by announcing the disk image having the diameter equal to the second threshold value L2 as the third image 55C, it is difficult to ensure the social distance in some cases. It is conceivable that the detection area where the first object and the second object exist is identified, and the third image 55C based on the second threshold value L2 is provided to the position of the first group in accordance with the detection area. Specifically, it is possible to vary the shape and the size of the third image 55C. Further, it is desirable for the annunciation method to be characterized in that the third image 55C is an image including an area distant at least as much as a length a half of a predetermined social distance from an outline of the detection area.

Figure 11:
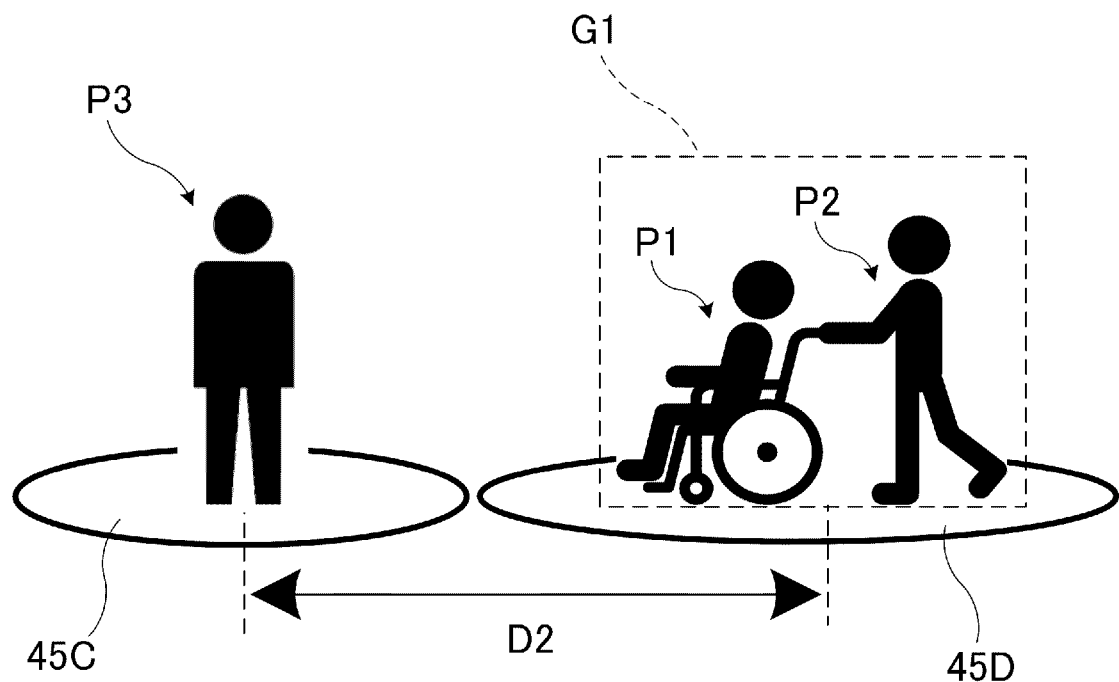
FIG. 11 is an explanatory diagram of a state in which an object and a group keep the social distance.

FIG. 11 is an explanatory diagram of a state in which an object and a group keep the social distance. The annunciation method according to the present embodiment includes obtaining the first position information as the position information of the place where the first object P1 is located, and obtaining the second position information as the position information of the place where the second object P2 is located. The annunciation method includes obtaining the third position information as the position information of the place where a third object P3 is located. There is included deciding the distance between the first object P1 and the second object P2 based on the first position information and the second position information. Further, the annunciation method includes combining the first object P1 and the second object P2 with each other to set the first object P1 and the second object P2 as the first group G1 when the distance between the first object P1 and the second object P2 is smaller than or equal to the first threshold value L1 set in advance. The annunciation method includes deciding the fourth position information representing the position of the first group G1. Further, the annunciation method includes announcing that the social distance is kept when the distance D2 between the third object P3 and the first group G1 calculated based on the third position information and the fourth position information is larger than the second threshold value L2 set in advance. Here, it is characterized in that the first threshold value L1 is smaller than the second threshold value L2. Specifically, the annunciation method provides a first image 45C showing the social distance centering on the position of the third object P3, and a first image 45D corresponding to the position of the first group G1.

Figure 12:
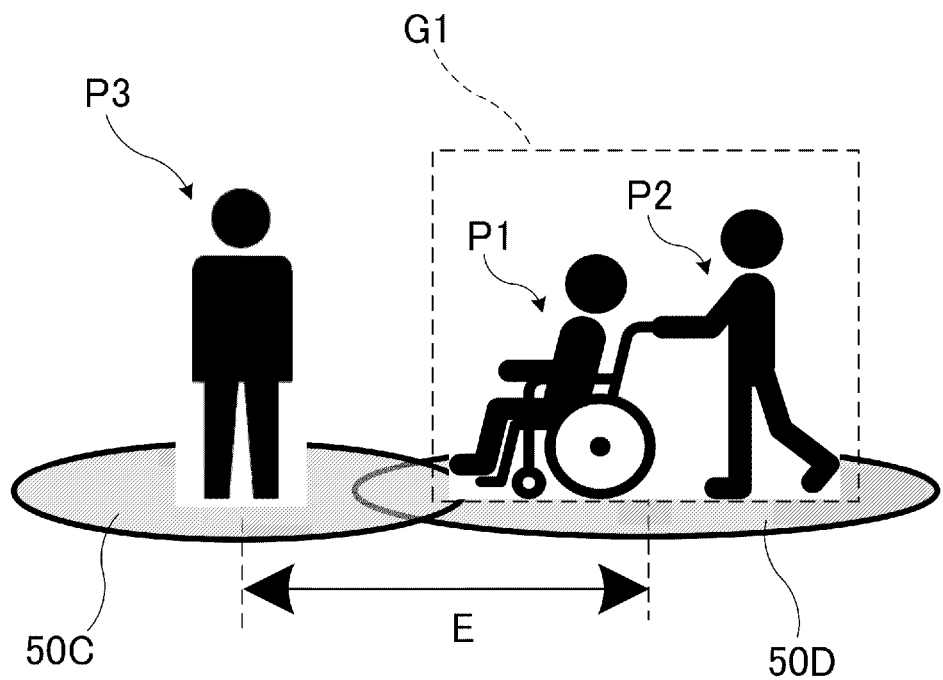
FIG. 12 is an explanatory diagram of a state in which a distance between an object and a group becomes shorter than the social distance.

FIG. 12 is an explanatory diagram of the annunciation method according to the present embodiment in the state in which a distance between an object and a group becomes shorter than the social distance. The annunciation method includes obtaining the first position information as the position information of the place where the first object P1 is located, and obtaining the second position information as the position information of the place where the second object P2 is located. Further, the annunciation method includes obtaining the third position information as the position information of the place where the third object P3 is located. The annunciation method includes deciding the distance between the first object and the second object based on the first position information and the second position information, and combining the first object and the second object with each other to set the first object and the second object as the first group G1 when the distance between the first object and the second object is smaller than or equal to the first threshold value L1. Further, the annunciation method includes deciding the fourth position information representing the position of the first group G1. The annunciation method includes providing a second image 50C and a second image 50D as the warning image when the distance between the third object and the first group G1 calculated based on the third position information and the fourth position information is smaller than the second threshold value L2 set in advance. Further, the annunciation method is characterized in that the first threshold value L1 is smaller than the second threshold value L2.

The annunciation method includes identifying the detection area where the first object P1 and the second object P2 exist, and providing the image based on the second threshold value L2 to the position of the first group G1 in accordance with the detection area. Specifically, it is conceivable that when the first object P1 itself occupies a large space, only by announcing the disk image having the diameter equal to the second threshold value L2 as the second image 50D, it is difficult to ensure the social distance in some cases. It is conceivable that the detection area where the first object P1 and the second object P2 exist is identified, and the second image 50D based on the second threshold value L2 is provided to the position of the first group G1 in accordance with the detection area. Specifically, it is possible to vary the shape and the size of the second image 50D. Further, it is possible to adopt the annunciation method characterized in that the second image 50D is an image including an area distant as much as a predetermined social distance from an outline of the detection area.

Figure 13:
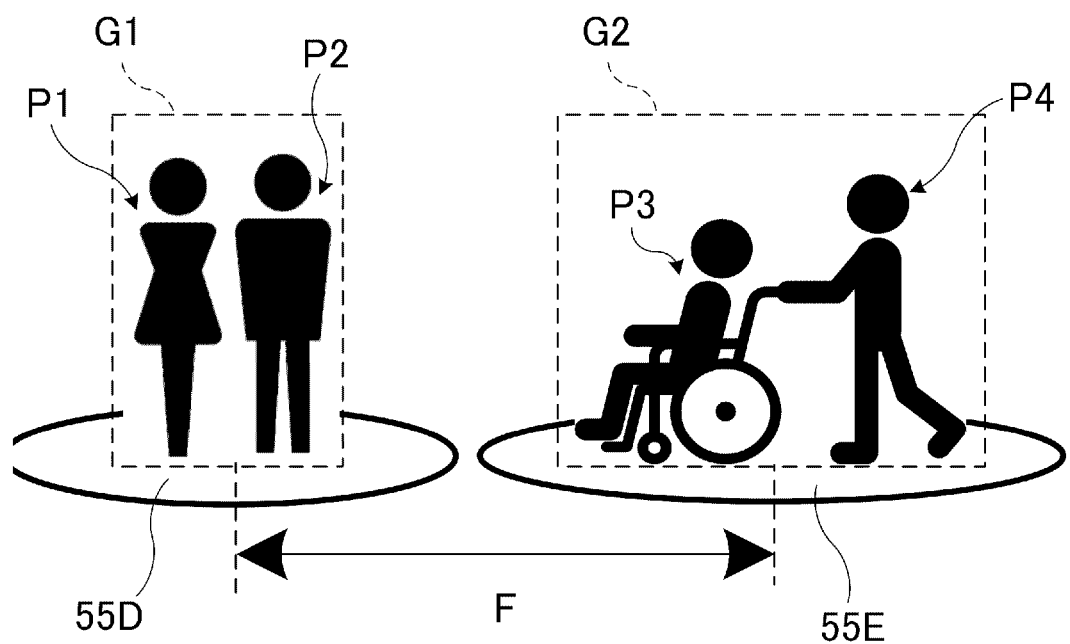
FIG. 13 is an explanatory diagram of two groups distant as much as a distance larger than or equal to the social distance from each other.

FIG. 13 is an explanatory diagram of the annunciation method of announcing a relationship between two groups distant as much as a distance larger than or equal to the social distance. The annunciation method according to the present embodiment includes obtaining the first position information as the position information of the place where the first object P1 is located, and obtaining the second position information as the position information of the place where the second object P2 is located. The annunciation method includes obtaining the third position information as the position information of the place where the third object P3 is located, and obtaining the fifth position information as the position information of the place where a fourth object P4 is located.

The annunciation method includes deciding the distance between the first object P1 and the second object P2 based on the first position information and the second position information. Further, the annunciation method includes combining the first object P1 and the second object P2 with each other to set the first object P1 and the second object P2 as the first group G1 when the distance between the first object and the second object is smaller than or equal to the first threshold value L1. Further, the annunciation method includes deciding the fourth position information representing the position of the first group G1. Further, the annunciation method includes combining the third object P3 and the fourth object P4 with each other to set the third object P3 and the fourth object P4 as a second group G2 when the distance between the third object P3 and the fourth object P4 calculated based on the third position information and the fifth position information is smaller than or equal to the first threshold value L1. The annunciation method includes deciding the sixth position information representing the position of the second group G2.

The annunciation method announces that the social distance is kept to the first group G1 and the second group G2 when the distance between the first group G1 and the second group G2 calculated based on the fourth position information and the sixth position information is larger than or equal to the second threshold value L2. Specifically, it is possible to project a third image 55D at the position of the first group G1, and project the third image 55E at the position of the second group G2. Here, it is possible for the shape and the size of the third images 55D and 55E to be able to be varied. Further, the third image can be an image including an area distant at least as much as a length a half of the predetermined social distance from the outline of the detection area with respect to each of the objects.

Figure 14:
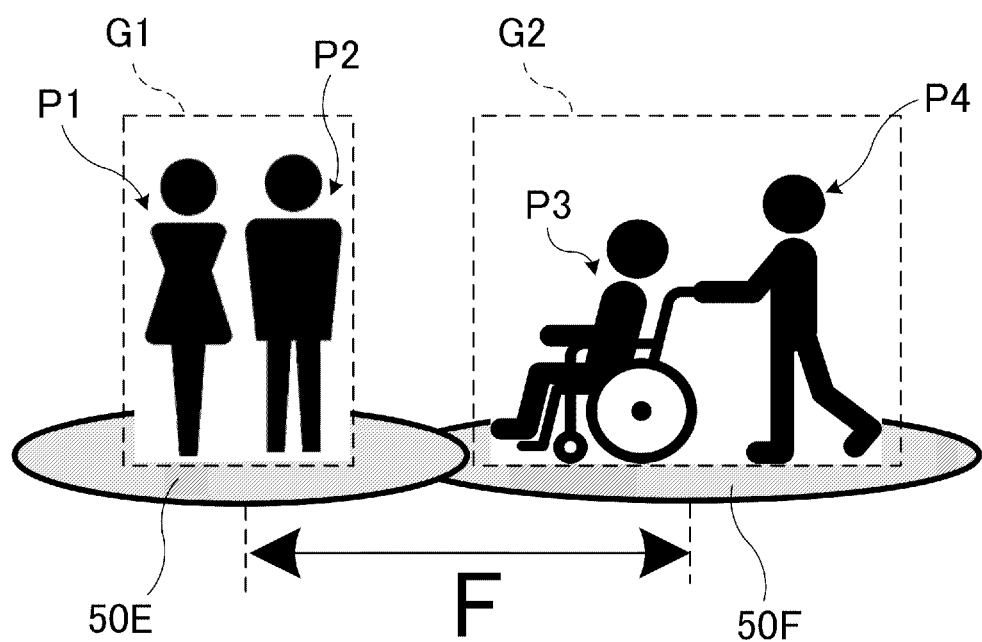
FIG. 14 is an explanatory diagram of a state in which a distance between two groups becomes shorter than the social distance.

FIG. 14 is an explanatory diagram of an annunciation method in the state in which a distance between two groups becomes shorter than the social distance. The annunciation method according to the present embodiment includes performing an annunciation when the distance between the first group G1 and the second group G2 calculated based on the fourth position information and the sixth position information described above is smaller than the second threshold value L2. Specifically, the performing an annunciation includes displaying a second image 50E and a second image 50F as the warning image at the position of the first group G1 and the position of the second group G2 when the distance between the first group G1 and the second group G2 is smaller than the second threshold value. The distance between the first group G1 and the second group G2 is calculated based on the fourth position information and the sixth position information.

The display system 1 according to the first embodiment is a display system provided with the information processing device 15 having the position information acquisition section 16 for obtaining the position information of the place where the object is located, and the arithmetic section 17 for calculating the distance between the objects based on the position information, and the information providing device for providing information to the outside, wherein the position information acquisition section 16 obtains the first position information as the position information of the place where the first object P1 is located, and the second position information as the position information of the place where the second object P2 is located, the arithmetic section 17 performs combining the first object P1 and the second object P2 with each other to set the first object P1 and the second object P2 as the first group G1 when the distance between the first object P1 and the second object P2 calculated based on the first position information and the second position information is smaller than or equal to the first threshold value set in advance, and deciding the fourth position information representing the position of the first group G1, and the information providing device displays the first image based on the distance from the position of the first group G1 based on the fourth position information.

According to such a display system, parent and child, and a person who needs care support such as a wheel chair and a care supporter which are not required to keep the social distance can be treated as a single group. Further, the information related to the social distance which these groups should keep can be announced through the information providing device provided to the display system. Therefore, since it is possible to provide the information related to the social distance to a necessary person when the person needs the information, there is exerted an excellent advantage that the risk of acquiring the infectious diseases in a public place is reduced, and the social behavior becomes comfortable.

The display system 1 according to the first embodiment is the display system 1 provided with the information processing device 15 having the position information acquisition section 16 for obtaining the position information of the place where the object is located, and the arithmetic section 17 for calculating the distance between the objects based on the position information, and the information providing device for providing information to the outside, wherein the position information acquisition section 16 obtains the first position information as the position information of the place where the first object P1 is located, the second position information as the position information of the place where the second object P2 is located, and the third position information as the position information of the place where the third object P3 is located, the arithmetic section 17 performs combining the first object P1 and the second object P2 with each other to set the first object P1 and the second object P2 as the first group G1 when the distance between the first object and the second object calculated based on the first position information and the second position information is smaller than or equal to the first threshold value set in advance, and deciding the fourth position information representing the position of the first group G1, the information providing device displays the warning image when the distance between the third object P3 and the first group G1 calculated based on the third position information and the fourth position information is smaller than the second threshold value set in advance, and the first threshold value is smaller than the second threshold value.

According to such a display system 1, parent and child, and a person who needs care support such as a wheel chair and a care supporter which are not required to keep the social distance can be treated as a single group. Further, when those groups fail to keep the social distance, it is possible to display the warning image. Therefore, since it is possible to provide the information related to the social distance to a necessary person when the person needs the information, there is exerted an excellent advantage that the risk of acquiring the infectious diseases in a public place is reduced, and the social behavior becomes comfortable.

The information processing device 15 according to the second embodiment is the information processing device 15 having the position information acquisition section 16 for obtaining the position information of the place where an object is located, and the arithmetic section 17 for calculating the distance between the objects based on the position information, wherein the position information acquisition section 16 obtains the first position information as the position information of the place where the first object P1 is located, the second position information as the position information of the place where the second object P2 is located, and the third position information as the position information of the place where the third object P3 is located, the arithmetic section 17 performs setting the first object P1 and the second object P2 as the first group G1 when the distance between the first object P1 and the second object P2 calculated based on the first position information and the second position information is smaller than or equal to the first threshold value set in advance, and deciding the fourth position information representing the position of the first group G1, there is further provided the annunciation section 18 which announces warning information when the distance between the third object P3 and the first group G1 calculated based on the third position information and the fourth position information is smaller than the second threshold value set in advance, and the first threshold value is smaller than the second threshold value.

According to such an information processing device 15, parent and child, and a person who needs care support such as a wheel chair and a care supporter which are not required to keep the social distance can be treated as a single group, and thus, the information related to the social distance which the group should keep can be announced. Therefore, since it is possible to provide the information related to the social distance to a necessary person when the person needs the information, there is exerted an excellent advantage that the risk of acquiring the infectious diseases in a public place is reduced, and the social behavior becomes comfortable.

In the information processing device 15 according to the second embodiment, the annunciation section 18 announces the warning information to the external device.

According to such an information processing device 15, even when the information processing device itself cannot provide the warning information directly to the person to be the target, it is possible to provide the warning information through the external device. Therefore, since it is possible to provide the information related to the social distance to a necessary person when the person needs the information, there is exerted an excellent advantage that the risk of acquiring the infectious diseases in a public place is reduced, and the social behavior becomes comfortable. The external device related to the second embodiment is assumed as the detection device 10 or the projector 20, but is not limited thereto. For example, by using a speaker for emitting a warning sound, it is possible to announce the warning information as a sound. Further, by using a flat panel display which is unfolded on the entire floor surface to display an image, and a head-mounted display, it is possible to visually announce the warning information.

The annunciation method according to the third embodiment includes obtaining the first position information as the position information of the place where the first object P1 is located, obtaining the second position information as the position information of the place where the second object P2 is located, obtaining the third position information as the position information of the place where the third object P3 is located, combining the first object P1 and the second object P2 with each other to set the first object P1 and the second object P2 as the first group G1 when the distance between the first object P1 and the second object P2 calculated based on the first position information and the second position information is smaller than or equal to the first threshold value set in advance, deciding the fourth position information representing the position of the first group G1, and performing annunciation when the distance between the third object P3 and the first group G1 calculated based on the third position information and the fourth position information is smaller than the second threshold value set in advance, wherein the first threshold value is smaller than the second threshold value.

According to such an annunciation method, parent and child, and a person who needs care support such as a wheel chair and a care supporter which are not required to keep the social distance can be treated as a single group, and thus, the information related to the social distance which the group should keep can be announced. Therefore, since it is possible to provide the information related to the social distance to a necessary person when the person needs the information, there is exerted an excellent advantage that the risk of acquiring the infectious diseases in a public place is reduced, and the social behavior becomes comfortable.

The annunciation method according to the third embodiment includes obtaining the fifth position information as the position information of the place where the fourth object P4 is located, combining the third object P3 and the fourth object P4 with each other to set the third object P3 and the fourth object P4 as the second group G2 when the distance between the third object P3 and the fourth object P4 calculated based on the third position information and the fifth position information is smaller than or equal to the first threshold value, deciding the sixth position information representing the position of the second group G2, and performing annunciation when the distance between the first group G1 and the second group G2 calculated based on the fourth position information and the sixth position information is smaller than the second threshold value.

According to such an annunciation method, two or more persons in an intimate relationship can be grouped and then detected, and it is possible to keep the social distance between the groups. Therefore, since it is possible to provide the information related to the social distance to a necessary person and a necessary group when the person and the group need the information, there is exerted an excellent advantage that the risk of acquiring the infectious diseases in a public place is reduced, and the social behavior becomes comfortable.

The annunciation method according to the third embodiment displays the first image at the position of the first group G1 and the position of the second group G2 when the distance between the first group G1 and the second group G2 calculated based on the fourth position information and the sixth position information is larger than or equal to the second threshold value.

According to such an annunciation method, when the social distance is kept between two or more groups, it is possible to visually inform the persons constituting the two or more groups of the fact that the social distance is kept therebetween. Therefore, since it is possible to provide the information related to the social distance to a necessary person and a necessary group when the person and the group need the information, there is exerted an excellent advantage that the risk of acquiring the infectious diseases in a public place is reduced, and the social behavior becomes comfortable.

In the annunciation method according to the third embodiment, performing annunciation is displaying the second image at the position of the first group G1 and the position of the second group G2.

When the social distance is not kept between two or more groups, it is possible to visually provide the persons constituting the two or more groups with the fact that the social distance is not kept therebetween as the warning information. Therefore, since it is possible to provide the information related to the social distance to a necessary person and a necessary group when the person and the group need the information, there is exerted an excellent advantage that the risk of acquiring the infectious diseases in a public place is reduced, and the social behavior becomes comfortable.

The annunciation method according to the third embodiment includes obtaining the first position information as the position information of the place where the first object P1 is located, obtaining the second position information as the position information of the place where the second object P2 is located, combining the first object P1 and the second object P2 with each other to set the first object P1 and the second object P2 as the first group G1 when the distance between the first object P1 and the second object P2 calculated based on the first position information and the second position information is smaller than or equal to the first threshold value set in advance, deciding the fourth position information representing the position of the first group G1, and providing the third image based on the distance from the position of the first group G1 based on the fourth position information.

According to such an annunciation method, parent and child, and a person who needs care support such as a wheel chair and a care supporter which are not required to keep the social distance can be treated as a single group, and thus, the information related to the social distance which the group should keep can visually be announced. Therefore, since it is possible to provide the information related to the social distance to a necessary person when the person needs the information in an easy-to-understand manner, there is exerted an excellent advantage that the risk of acquiring the infectious diseases in a public place is reduced, and the social behavior becomes comfortable.

The annunciation method according to the third embodiment includes identifying the detection area where the first object P1 and the second object P2 exist, and providing the third image varied in shape and size to the position of the first group G1 in accordance with the detection area.

According to such an annunciation method, when treating parent and child, and a person who needs care support such as a wheel chair and a care supporter which are not required to keep the social distance as a single group, it is possible to visually provide the information related to the social distance which the group itself should keep from others. Therefore, since it is possible to provide the information related to the social distance to a necessary group when the group needs the information in an easy-to-understand manner, there is exerted an excellent advantage that the risk of acquiring the infectious diseases in a public place is reduced, and the social behavior becomes comfortable.

The annunciation method according to the third embodiment includes obtaining the third position information as the position information of the place where the third object P3 is located, providing the third image when the distance between the third object P3 and the first group calculated based on the third position information and the fourth position information is larger than the second threshold value set in advance, and providing the warning image instead of the third image when the distance between the third object P3 and the first group G1 is smaller than the second threshold value, wherein the third image is an image including an area distant as much as a predetermined distance based on the second threshold value from the outline of the detection area.

According to such an annunciation method, when treating parent and child, and a person who needs care support such as a wheel chair and a care supporter which are not required to keep the social distance as a single group, it is possible to visually provide the information related to the social distance which the group itself should keep from others. Therefore, since it is possible to provide the information related to the social distance to a necessary group when the group needs the information in an easy-to-understand manner, there is exerted an excellent advantage that the risk of acquiring the infectious diseases in a public place is reduced, and the social behavior becomes comfortable.

The embodiments described above are only for showing an aspect of the present disclosure, and modifications and applications can arbitrarily be made within the scope or the spirit of the present disclosure.

For example, each of the sections and each of the devices shown in FIG. 1 and FIG. 2 are illustrative only, and the specific implementation configuration is not particularly limited. In other words, it is not necessarily required to install the hardware individually corresponding to each of the sections, and it is obviously possible to adopt a configuration realizing the functions of the sections by a single processor executing a program. Further, a part of the functions realized by software in the embodiments described above can also be realized by hardware, or a part of the functions realized by hardware can also be realized by software. Besides the above, the specific detailed configurations of, for example, the detection device 10, the information processing device 15, and the projector 20 as the information providing device can arbitrarily be modified within the scope or the spirit of the present disclosure.

Further, for example, unit steps of the operations shown in FIG. 3, FIG. 4, and FIG. 5 are obtained by dividing the operations in accordance with principal processing contents in order to make it easy to understand the operation of each process of the annunciation method realized by the display system 1, and the present disclosure is not limited by the way of the division or the name of the processing unit. It is possible to divide the operations into a larger number of unit steps in accordance with the processing contents. Further, it is also possible to divide the operations so that each of the unit steps includes a larger amount of processing. Further, the order of the steps can arbitrarily be exchanged within a range in which no problem is posed in the scope or the spirit of the present disclosure.

What is claimed is:

1. An annunciation method comprising:
controlling a camera to capture a detection image of a detection range of the camera;
generating a differential range image based on the captured detection image and a reference image of the detection range of the camera stored in a storage;
obtaining, from the differential range image, first position information representing a position of a first object;
obtaining, from the differential range image, second position information representing a position of a second object;
obtaining, from the differential range image, third position information representing a position of a third object;
setting the first object and the second object as a first group when a distance between the first object and the second object calculated based on the first position information and the second position information is smaller than or equal to a first threshold value;
obtaining fourth position information representing a position of the first group; and
performing annunciation when a distance between the third object and the first group calculated based on the third position information and the fourth position information is smaller than a second threshold value which is larger than the first value.

2. The annunciation method according to claim 1, further comprising:
obtaining fifth position information representing a position of a fourth object;
setting the third object and the fourth object as a second group when a distance between the third object and the fourth object calculated based on the third position information and the fifth position information is smaller than or equal to the first threshold value;
obtaining sixth position information representing a position of the second group; and
performing annunciation when a distance between the first group and the second group calculated based on the fourth position information and the sixth position information is smaller than the second threshold value.

3. The annunciation method according to claim 2, further comprising:
displaying a first image at the position of the first group and the position of the second group when the distance between the first group and the second group calculated based on the fourth position information and the sixth position information is larger than or equal to the second threshold value.

4. The annunciation method according to claim 2, wherein the performing the annunciation is displaying a second image at the position of the first group and the position of the second group.

5. An annunciation method comprising:
controlling a camera to capture a detection image of a detection range of the camera;
generating a differential range image based on the captured detection image and a reference image of the detection range of the camera stored in a storage;

obtaining, from the differential range image first position information representing a position of a first object;

obtaining, from the differential range image second position information representing a position of a second object;

setting the first object and the second object as a first group when a distance between the first object and the second object calculated based on the first position information and the second position information is smaller than or equal to a first threshold value;

obtaining fourth position information representing a position of the first group; and displaying a third image based on a distance from the position of the first group based on the fourth position information.

6. The annunciation method according to claim 5, further comprising:

identifying a detection area where the first object and the second object exist; and displaying the third image varied in shape and size at the position of the first group in accordance with the detection area.

7. The annunciation method according to claim 6, further comprising:

obtaining third position information representing a position of a third object; and displaying the third image when a distance between the third object and the first group calculated based on the third position information and the fourth position information is larger than a second threshold value; and displaying a warning image instead of the third image when the distance between the third object and the first group is smaller than the second threshold value, wherein the third image is an image including an area distant as much as a predetermined distance based on the second threshold value from an outline of the detection area.

8. An information processing device comprising:

a processing device programmed to control a camera to capture a detection image of a detection range of the camera;

generate a differential range image based on the captured detection range image and a reference image of the detection range of the camera stored in a storage;

obtain, from the differential range image, first position information representing a position of a first object, second position information representing a position of a second object, and third position information representing a position of a third object, set the first object and the second object as a first group when a distance between the first object and the second object calculated based on the first position information and the second position information is smaller than or equal to a first threshold value, and obtain fourth position information representing a position of the first group, and announce warning information when a distance between the third object and the first group calculated based on the third position information and the fourth position information is smaller than a second threshold value which is larger than the first value.

9. The information processing device according to claim 8, wherein the processing device announces the warning information to an external device.

* * * * *